United States Patent [19]
Busick et al.

[11] Patent Number: 5,373,205
[45] Date of Patent: Dec. 13, 1994

[54] METHOD AND APPARATUS FOR LIMITING MOTOR CURRENT

[75] Inventors: Rickey L. Busick, Hamilton; Mark S. Taylor; Stephen T. Walsh, both of Cincinnati, all of Ohio

[73] Assignee: Cincinnati Milacron Inc., Cincinnati, Ohio

[21] Appl. No.: 998,909

[22] Filed: Dec. 29, 1992

[51] Int. Cl.⁵ .................... H03K 5/13; H02K 17/32
[52] U.S. Cl. ................... 327/378; 318/434; 318/254; 323/907; 363/58; 374/163; 307/116; 361/23; 327/322
[58] Field of Search ........... 374/100, 169, 168, 163; 307/568, 132 T, 202.1, 491, 591, 116; 323/241, 275, 277, 366, 282, 284, 907; 361/23, 25, 103, 106, 23, 24, 25; 363/58, 98, 132, 124; 318/788, 254, 434, 138; 388/831, 920

[56] References Cited

U.S. PATENT DOCUMENTS

| | | | |
|---|---|---|---|
| 3,617,807 | 11/1971 | Kessetring | 307/136 |
| 3,643,142 | 2/1972 | McBride, Jr. | 318/788 |
| 3,805,184 | 4/1974 | Visioli et al. | 323/241 |
| 3,832,612 | 8/1974 | Woods | 318/788 |
| 3,868,554 | 2/1975 | Konrad | 318/434 |
| 3,906,797 | 9/1975 | Turner | 374/168 |
| 3,959,713 | 5/1976 | Davis et al. | 323/68 |
| 3,972,237 | 8/1976 | Turner | 374/169 |
| 4,257,092 | 3/1981 | Prines et al. | 388/831 |
| 4,300,079 | 11/1981 | Kawada et al. | |
| 4,302,711 | 11/1981 | Morser et al. | |
| 4,473,783 | 9/1984 | Vermesse | |
| 4,494,064 | 1/1985 | Harkness | 323/277 |
| 4,514,665 | 4/1985 | Melocik et al. | |
| 4,700,130 | 10/1987 | Bloemen | 307/202.1 |
| 4,972,136 | 11/1990 | Banura | 323/275 |
| 5,079,455 | 1/1992 | McCafferty et al. | 307/568 |

OTHER PUBLICATIONS

Siemen's Manual 36SC61, *Transistor PWM Converters*, Chapter 3.3.2, Closed-loop control, pp. 3-26 and 3-27.

Primary Examiner—Jonathan Wysocki
Assistant Examiner—John W. Cabeca
Attorney, Agent, or Firm—Wood, Herron & Evans

[57] ABSTRACT

A method and apparatus for limiting current through a switching device supplying current to a load. A control evaluates a model representing the switching device temperature as a nonlinear function of current and time. The model compares the temperature of the switching device to a maximum allowable temperature. The current limit is defaulted to peak current; and in response to the model detecting a temperature in excess of the maximum allowable temperature, a nominal current limit is set. The current limit reset to peak current after the model detects a switching device temperature a predetermined magnitude below the maximum allowable temperature.

26 Claims, 3 Drawing Sheets

METHOD AND APPARATUS FOR LIMITING MOTOR CURRENT

BACKGROUND OF THE INVENTION

1. Field of the Invention

This invention relates generally to the control of motors, and more particularly, to a motor control providing current limit control as a function of the maximum allowable temperature in the switching devices.

2. Description of the Related Art

A motor control for a brushless DC motor typically produces a current command signal to an input of a pulse width modulator controlling semiconductor switching devices which switch current from a power source to the motor. The switching devices are typically transistor switches. For purposes of this disclosure, "nominal current" shall mean that value of current flow through the switching devices which, over time, produces the maximum allowable switching device temperature. For purposes of this disclosure, "peak current" shall mean the maximum instantaneous current which the switching devices are capable of delivering. Typically, peak current is an integer multiplier of, for example, twice, the nominal current. A current overload is defined by a commanded current in a range between the nominal and peak currents.

Operating the switching devices with a current overload will raise their temperature above the maximum allowable switching device temperature. When this occurs, the switching devices will fail catastrophically. The time required to reach the maximum allowable switching device temperature is a function of the thermal characteristics of the switching device and the heat sink and magnitude of the current overload.

Many applications require that the motor be commanded through a series of rapid changes of velocity which may include reversals in the direction of operation. To achieve the necessary acceleration and deceleration rates, the desired commanded current will substantially exceed more typical operating currents. Design and cost limitations generally require that the size of the transistors and their heat sinks be limited thereby establishing a nominal current that is less than the anticipated maximum current. Therefore, commanding the maximum current required by severe accelerations and decelerations will result in the switching devices being operated at a current overload. In other situations, the motor may be stalled because its load has encountered an obstacle or there is some other unforeseen occurrence inhibiting its motion. When that happens, the servo control loop around the motor will produce a large error signal which in turn will eventually cause the rated peak current to be commanded. That condition must be quickly detected and limited to avoid damage to the switching devices.

Prior motor controls have analog circuits that limit the application of current overloads to protect the transistor switches from overheating. For example, they may limit the period of time that an overload current may be conducted by the transistor switch in proportion to the magnitude of the overload. However, prior art limiting circuits are typically analog circuits that measure the current overload in terms of an Ohm's Law $I^2R$ model. The limiting circuit produces a linear limiting function in which the slope of limiting function is changed as a function of the current overload. Therefore, the period of time the switching device is conducting a current overload is regulated to protect the device from the excessive build-up of heat. A current limit circuit using a linear limiting function has several disadvantages. First, limiting current as a linear time based function to values below the peak current generally underutilizes the capability of the switching device to operate with current overloads. Second, a limiting function changing linearly with time does not accurately respond to either rapidly changing current commands or constant current command values. Such a circuit may limit overloads too quickly yielding suboptimal performance, or not quickly enough thereby permitting the switching device to overheat. Further, it does not permit current overloads to be accurately controlled in accordance with the manufacturer's overload versus time function. Finally, such analog circuits are not easily adjusted from one motor drive to another.

SUMMARY OF THE INVENTION

To overcome the disadvantages of existing current limit controls, a primary object of the present invention is to provide a motor drive which regulates current overloads as a function of a more accurate exponential time model of temperature in the switching devices and their heat sinks.

According to the principles of the present invention, a control evaluates a model of the switching device temperature as a function of a calculation of the power dissipated and heat losses in the switching device to determine current limits. The temperature model is based on the following relationship of temperature, power and time:

$$Hx = K \times P(I) \times [1 - e^{-\frac{t}{K_{th}}}]$$

where
- $H_x$ = temperature of the switching device,
- $P(I)$ = power dissipated in the switching device as a function of the present current command,
- $t$ = time in seconds,
- $K_{th}$ = thermal time coefficient of the switching device,
- $K$ = normalizing constant In the time sampled system implementation of the invention, the model is periodically evaluated at update intervals so that it cumulatively represents both the heat effects caused by the present current and the residual heat effects arising from previous currents. The model converges nonlinearly over time to a constant value in response to a constant current. The temperature model uses the thermal time constant and other parameters specific to the switching devices to further enhance its accuracy. In addition, in the sample time implementation, heat effects are averaged over the present and preceding current values.

The calculation of dissipated power used in the temperature model includes two components apportioned to conform the computed power to the characteristics of the actual device. A calculated ($I \times V$) linear component is associated with heating attributable to the product of current through and voltage across the device. A calculated ($I^2 \times R$) nonlinear component is associated with resistive heating of the device's junction and internal connections. The function of the dissipated power $P(I)$ is:

$$P(I) = (K_1 \times I) + (K_2 \times I^2)$$

where

P(I)=power dissipated in the switching device as a function of the current I, $K_1$=thermal linearity coefficient, $0 \leq K_1 \leq 1$, and $K_2 = (1 - K_1)$.

In operation, the present invention defaults to a current limit equal to the rated peak current. The temperature model is periodically re-evaluated, and compares the calculated temperature of the switching device and its heat sink as a function of present and prior commanded currents to the maximum allowable temperature. The current limit is set to the nominal current when the calculated switching device temperature reaches or exceeds the maximum allowable switching device temperature. The current limit is reset to the peak current when the switching device temperature falls a predetermined magnitude below the maximum allowable temperature.

The exponential temperature model more accurately reflects the influence of current on switching device temperature and provides an advantage of optimizing the operation of the switching device with a current overload. The model permits switching the current limit between the thresholds of peak and nominal currents, thereby providing a further advantage of maximizing the peak current capability of the switching device. Another advantage is that the thermal time constant, thermal linearity coefficient and other device parameters permit tailoring the current limits to the characteristics of individual switching devices. The model permits switching device operation to better conform to manufacturer's specifications.

These and other objects and advantages of the invention will be apparent to those skilled in the art in light of the present disclosure including the accompanying drawings, the detailed description of the invention and the appended claims.

DETAILED DESCRIPTION

To illustrate the invention, a control implementation of the current limit developed by Cincinnati Milacron Inc., the assignee of the present invention, shall be described in detail. This embodiment of the invention and the description thereof is not intended to be in any way limiting in respect of the scope of the invention which is defined by the appended claims and all equivalents thereof.

The current limit control of the present invention is particularly advantageously adapted to control brushless DC motors used as actuators for effecting motion of moveable machine members along machine axes. In such applications, desired motor performance may vary with the task being performed thereby making it desirable to be able to optimize motor performance to changing requirements.

Figure 1:
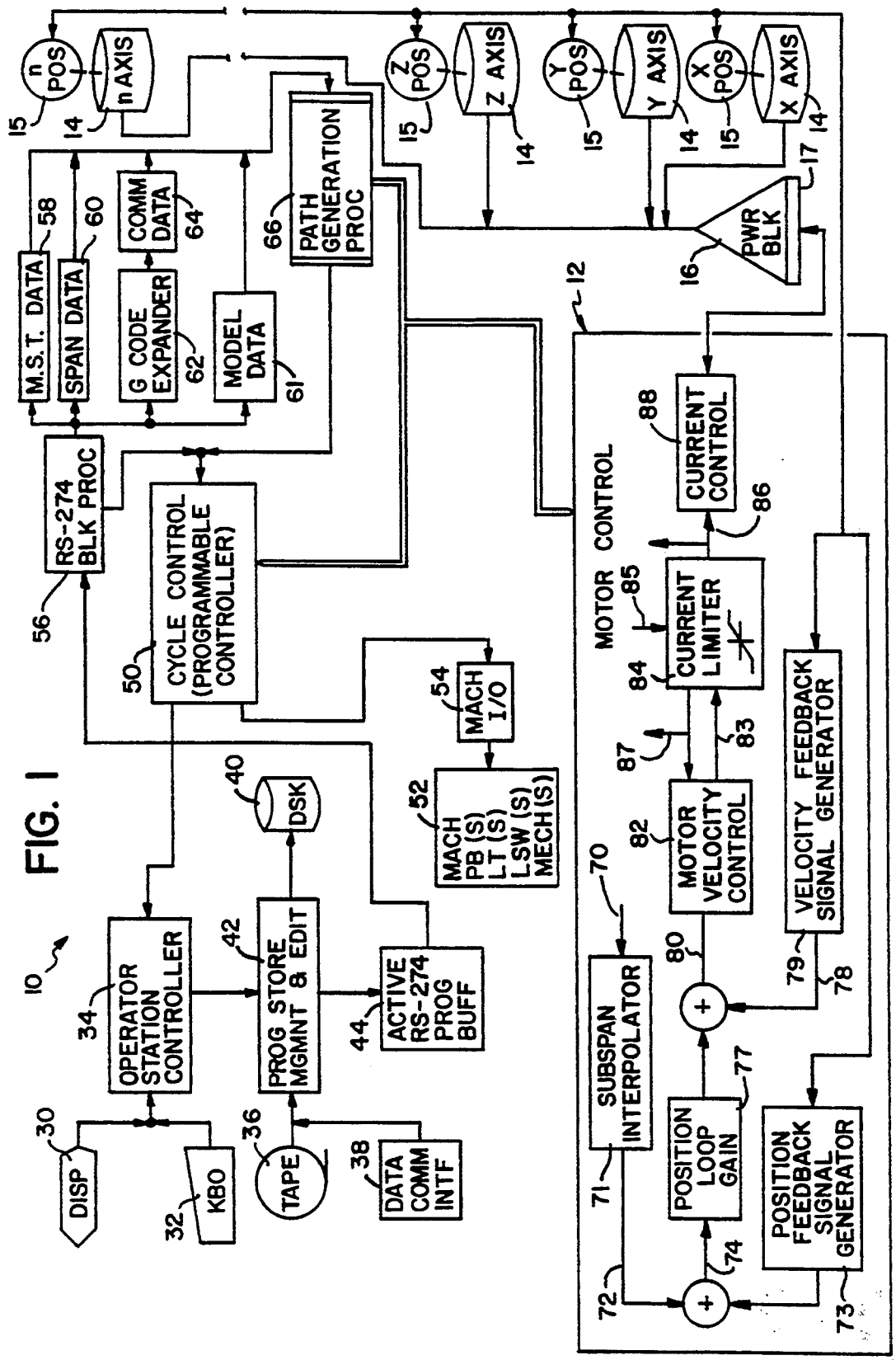
FIG. 1 is a block diagram of a machine control with which the present invention may advantageously be used.

Referring to FIG. 1, a numerical control system 10 is connected to a motor control 12 which provides an interface between the numerical control 10 and the machine axes' motors 14 and position transducers 15. The numerical control 10 includes: an operator or user interface; machine mechanism interface and control; program storage and edit facilities; machine cycle control; and work piece program processing and path generation control. The operator interface includes a display device 30 such as a CRT or other alphanumeric display device, a manual data entry device such as keyboard 32 and an operator station controller 34. The operator station controller receives data to be displayed and formats the data for the display device 30. Manual data entries from the keyboard 32 are encoded by operator station controller 34 for distribution to other numerical control system elements. Operator station controller 34 enables manual data input in accordance with the active mode of operation of the machine as determined by the cycle control 50.

In addition to manual data input, workpiece programs may be entered into local storage of the control by means of bulk data transfer devices such as, for example a tape reader 36 or a data communication interface 38. Bulk storage of workpiece programs is provided on disk store 40. A program storage and edit controller 42 manages the communication of data from the input devices 36 and 38 to and from the bulk store 40 as well as to and from the operator station controller 34. A workpiece program buffer 44 is provided for active programs, and program instructions are transferred for execution from the buffer 44.

The over all cycle of operation of the numerical control 10 is controlled by the cycle control 50. Cycle control 50 operates as a conventional programmable controller to execute control programs relating machine push buttons, lights, limit switches and mechanisms such as transmissions, tool changers, workpiece transfer devices and so forth and the cycle of operation of the controlled machine. The machine elements are indicated generally by block 52 and are monitored and controlled through a machine input-output interface 54. In control of the cycle of operation of the machine, cycle control 50 effects transfer of workpiece program instructions from the buffer 44 to a block processor 56. Further, cycle control 50 monitors the machine status and effects the appropriate response to error conditions.

Workpiece programs consist of blocks of instructions containing coordinate data, feed rate data, tool data, spindle speed data, miscellaneous function data and cycle control codes. The block processor 56 decodes each block of instructions and distributes the data as appropriate for control of machine functioning. Miscellaneous function, spindle speed and tool data associated with machine functions such as tool selection, transmission speed changes and mechanism control are placed in the data store 58. Coordinate data specifying end points for the machine member axes of motion are placed in the data store 60. Code expander 62 operates on cycle control codes to effect selection of commissioning data from the commissioning data store 64 and to select the desired mode of path generation.

Path generation processor 66 periodically produces coordinate axis position commands for position command update intervals in accordance with the machine operations specified by the active workpiece program instructions. The position commands produced by path generation processor 66 reflect the rate of change of position of all machine axes as defined by the programmed coordinates, feed rates, and cycle commands.

In applicants' preferred embodiment communication between the motor control 12 and NC systems processors 18 is accomplished over a data bus conforming to the IEEE 796-88 signal specification for the P1 connector. Data entered under control of the operation station controller 34 or from the workpiece program as well as data from commissioning data store 64 are all available over the data bus 26 to the motor control 12.

Within the motor control 12, FIG. 1 schematically illustrates the functional elements used to effect current limit control of a single motor, and those functional elements are duplicated for each motor being controlled. During position command update intervals, the motor control 12 receives input position command signals from the numerical control 10 on line 70. Changes in the position command signals define desired velocities of machine members (not shown) connected to the machine axes' motors 14. A subspan interpolator 71 interpolates subspans of a commanded position represented by the position command signals. In response to the output data from a position transducer 15 connected to a machine axis motor 14, a position feedback generator 73 determines the measured position of the motor. A position error is produced by algebraically suturing the subspans of the commanded position and the measured position of the motor.

A velocity command is produced by modifying the position error as a function of the position loop gain $K_v$ at block 77. The velocity of the motor is determined by velocity feedback generator 79 in response to the feedback from position transducer 15. A velocity error is produced by algebraically summing the velocity command and the velocity of the motor. The motion requirements of the motor as represented by the velocity command are used by the motor velocity control 82 to compute a required current command on line 83.

A current limiter 84 receives a current limit signal on line 85 from the numerical control 10 and compares the current limit to the required current command. If the required current command is less than the current limit, the computed required current command is output as a current command signal to the current control 88. If the required current command is greater than the current limit, the required current command is clipped at the limit value to produce a limited current command signal on line 86. The current command signals output of the current limiter on line 86 are fedback to the numerical control 10. In addition, if the required current command is subjected to a limit, the current limiter sets a current limit exceeded flag on line 87 which is fedback to the motor velocity control 82 and the numerical control 10.

Commutation pattern control signals and pulse width modulated switching transistor control signals representing the current command signals and commutation control signals are produced by the current control 88 to control the switching transistors in the power block 16. The current command signals are preferably produced by digitally implemented position and velocity control loops operating in response to the position command signals received from the numerical control 10 during the position command update intervals.

Figure 2:
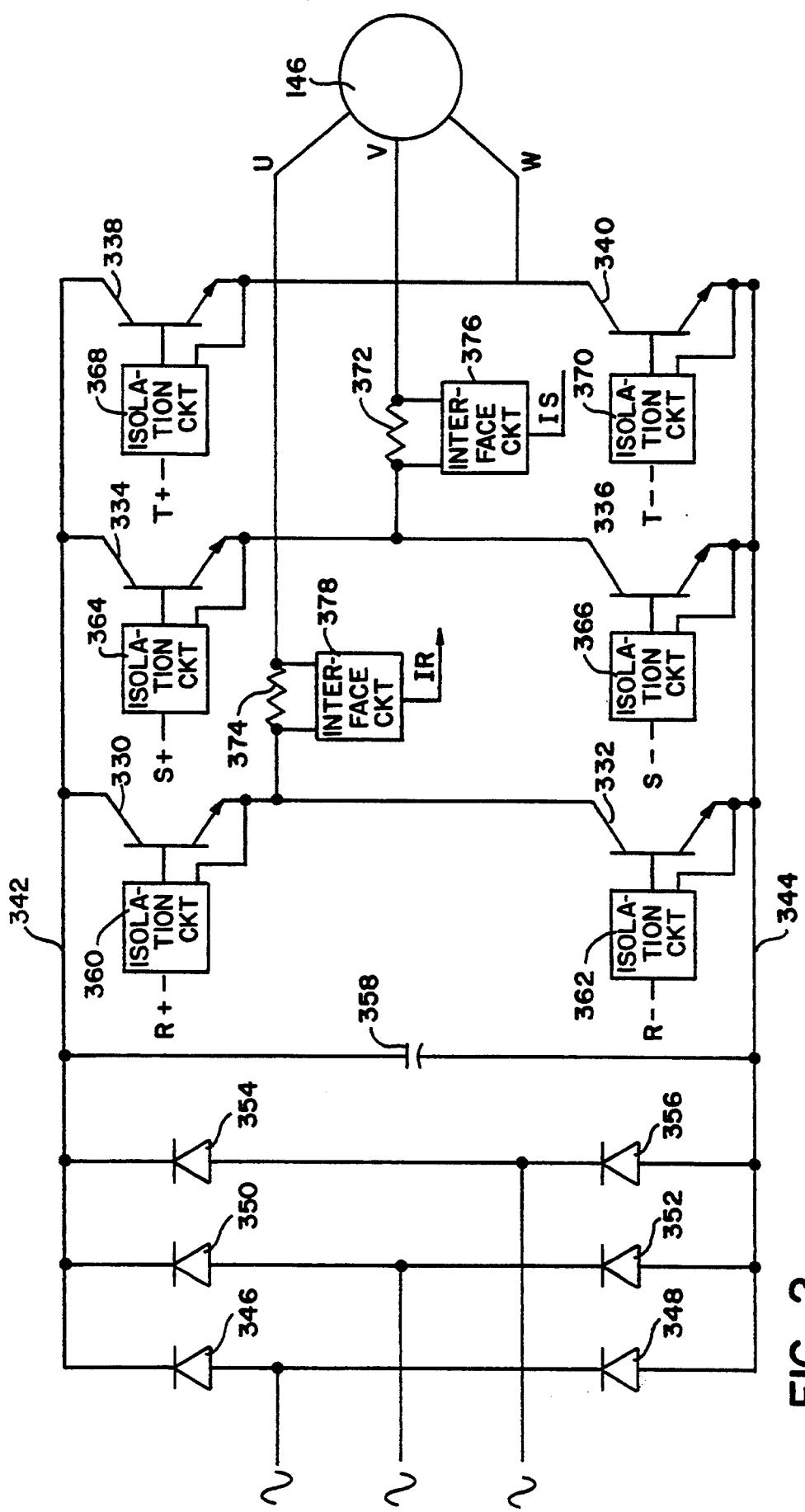
FIG. 2 is a circuit diagram of the switching transistor connections of the power block module of FIG. 1.

A detailed description of the circuitry used for applying power to the stator coils for each of the controlled motors shall be given with reference to FIG. 2. A brushless DC motor such as machine axes' motors 14 includes a network of three distributed stator windings connected in, for example, a conventional wye configuration to terminals U, V, and W. Current may be conducted through a desired combination of the stator windings by providing a current path between a DC power supply and the appropriate combination of the terminals U, V, and W. The desired combination is determined from the sextant data contained in the commutation pattern control.

As is conventional, power may be derived from a source of three phase AC current which is rectified and filtered. In the preferred embodiment, three phase power is rectified by the network of diodes 346 through 356 and filtered by capacitor 358 to produce a DC voltage having a positive polarity at line 342. A DC current return is provided by line 344 (the lines 342 and 344 are referred to collectively as the power rails of the power block module 16).

Current is applied to the motor terminals through a network of switching transistors 330 through 340 which are physically mounted on heat sink 17 of power block 16. Transistor pairs 330 and 332; 334 and 336; and, 338 and 340 provide source and return switches for, respectively terminals U, V, and W of motor 138. It will be appreciated that for each transistor pair, it is intended that only one transistor be conducting at any time to provide a path for DC current between, alternatively, the lines 342 and 344, and the motor terminal. Each transistor is switched between its conducting and nonconducting conditions by means of conventional isolation circuits 360 through 370 providing signal isolation between low level control signals and the currents switched. Applicants have chosen isolation circuits including optical couplers and base drive circuitry for the switching transistors.

Control of current in the stator windings is achieved by pulse width modulation of voltage applied by the switching transistors. Pulse width modulation is effected in response to the current commands and measured stator currents derived from current sampling shunt resistors 372 and 374. These resistors produce voltages representative of the magnitude of current through the stator windings. Interface circuits 376 and 378 convert the amplitude analogue representation of motor current appearing across shunt resistors 372 and 374, respectively, to pulse width modulated representations and provide transformer isolation for transferring the measured motor current signals in pulse width modulated form to the motor control 12. The frequency of pulse-width modulation of the current feedback signals is such that the modulation does not introduce significant time lag into the representation of motor current. The instantaneous states of the switching transistor control signals is determined by the sextant data of the commutation pattern control and pulse width modulation control signals generated to maintain a desired stator winding current. The control signals are generated in pairs and have a delay period introduced to allow for the transition time between conducting and nonconducting states of the switching transistors 330 through 340.

To provide effective current limit control, the present invention evaluates models of the temperature of the switching transistors for machine axes' motors as a nonlinear function of present and prior commanded currents for the motors and an exponential function of time. The temperature in the switching devices and the heat sinks is modeled in the control as a single pole low pass filter of the form $$\frac{a}{(s+a)}$$

where $$a = \frac{1}{K_{th}}.$$

The time domain response to a step input of current is:

$$Hx = K \times P(I) \times [1 - e^{-\frac{t}{K_{th}}}] \quad (1)$$

where $H_x$ = temperature of the switching device,
$P(I)$ = power dissipated in the switching device as a function of the present current command signal,
$t$ = time in seconds, and
$K_{th}$ = thermal time constant of the switching device, in this case, the time required to reach 63.2% of the maximum allowable switching device temperature at nominal current.
$K$ = normalizing constant Over time, the nominal current, $I_{nom}$, will produce a temperature value asymptotically approaching the maximum allowable temperature, $H_{max}$, in the switching device. In other words, for $I = I_{nom}$, as t approaches infinity, $H_x$ will approach $H_{max}$. Therefore, $$H\text{max} = K \times P(I\text{nom}),$$

$$K = \frac{H\text{max}}{P(I\text{nom})}$$

and Equation (1) may be rewritten as follows:

$$Hr = \frac{Hx}{H\text{max}} = \frac{P(I) \times [1 - e^{-\frac{t}{K_{th}}}]}{P(I\text{nom})}$$

where $H_r$ = temperature ratio comparing switching device temperature to its maximum allowable temperature,
$P(I_{nom})$ = power dissipated in the switching device as a function of the nominal current.

Therefore, the transfer function is:

$$\frac{Hr(s)}{P(s)} = \frac{1}{P(I\text{nom})} \times \frac{1}{1 + (K_{th} \times s)}$$

Using the pole-zero mapping technique $[z = e^{(s \times T)}]$, The pole at $$s = \frac{-1}{K_{th}};$$

maps to $$z = e^{-\frac{T}{K_{th}}}$$

where $T$ = sample interval time of the temperature model.

The zero at s = infinity is mapped to z = −1. Therefore, the z transform of the temperature model is $$\frac{Hr(z)}{P(z)} = \frac{G}{P(I\text{nom})} \times \frac{z + 1}{[z - e^{-\frac{T}{K_{th}}}]} \quad (2)$$

where G equals the gain required to match the gains of the discrete and continuous temperature models. Matching the steady state output for a step input (s = 0, z = 1) gives $$G = \frac{[1 - e^{-\frac{T}{K_{th}}}]}{2}$$

Let $$K_g = \frac{[1 - e^{-\frac{T}{K_{th}}}]}{2 \times P(I\text{nom})} \text{ and } K_e = e^{-\frac{T}{K_{th}}}$$

Therefore, equation (2) may be rewritten as:

$$\frac{Hr(z)}{P(z)} = K_g \times \frac{z + 1}{z - K_e}$$

$$z \times Hr(z) = [z \times K_g \times P(z)] + [K_g \times P(z)] + [K_e \times Hr(z)]$$

The discrete difference equation is:

$$(Hr)_n = [K_g \times P(I_n)] + [K_g \times P(I_{n-1})] + [K_e \times (Hr)_{n-1}]$$
or $$Hr_n = \frac{Hx_n}{H\text{max}} = \quad (3)$$

$$G \times \frac{P(I_n)}{P(I\text{nom})} + G \times \frac{P(I_{n-1})}{P(I\text{nom})} + k_e \times (Hr)_{n-1}$$

where n = the current sample interval time of the temperature model,
(n − 1) = the preceding sample interval time of the temperature model,
$P(I_n)$ = power dissipated in the device as a function of the present current command signal,
$P(I_{n-1})$ = power dissipated in the device as a function of the preceding current command signal, $$K_e = e^{-\frac{T}{K_{th}}} = \text{ a first filter coefficient analogous to the thermal coefficient of the heat sink,}$$

G = a second filter coefficient, and
$(H_r)_{n-1}$ = heat ratio value calculated for the preceding current command signal.

G and $K_e$ are constants which are determined as a function of the thermal time constant $K_{th}$ and include scaling factors to normalize the temperature ratio. The dependency of the model constants G and $K_e$ on the thermal time constant $K_{th}$ helps the model conform to the thermal characteristics of the switching devices being used. Therefore, the thermal time constant helps provide a more accurate temperature model.

As will be appreciated, a different mapping technique may be used to produce a different solution. Alternatively, the zero at s=infinity is mapped to z=0. Therefore, the z transform of the temperature model is $$\frac{Hr(z)}{P(z)} = \frac{G'}{P(I\text{nom})} \times \frac{z}{[z - e^{-\frac{T}{Kth}}]} \quad (2)$$

where G' equals the gain required to match the gains of the discrete and continuous temperature models. Matching the steady state output for a step input (s=0, z=1) gives $$G' = [1 - e^{-\frac{T}{Kth}}]$$

Let $$K_{g'} = \frac{[1 - e^{-\frac{T}{Kth}}]}{P(I\text{nom})} \text{ and } K_e = e^{-\frac{T}{Kth}}$$

Therefore, equation (2) may be rewritten as:

$$\frac{Hr(z)}{P(z)} = K_{g'} \times \frac{z}{z - K_e}$$

$$z \times Hr(z) = [z \times K_{g'} \times P(z)] + [K_e \times Hr(z)]$$

The discrete difference equation is:

$$(Hr)_n = [K_{g'} \times P(I_n)] + [K_e \times (Hr)_{n-1}]$$
or $$Hr_n = \frac{Hx_n}{H\max} = G' \times \frac{P(I_n)}{P(I\text{nom})} + k_e \times Hr_{n-1} \quad (4)$$

With either implementation of the model, the control strategy defines a temperature ratio which compares a calculated value of the present switching device temperature based on the model of equation (1) to the maximum allowable switching device temperature. The current limit is defaulted to the peak current value; and when the control detects that the temperature ratio equals or exceeds unity, the current limit is set to the nominal current value. The current limit thresholds are controlled as a function of the switching device temperature thereby optimizing the current overload performance of the switching device.

The above implementation of the model of equation (1) is a comparison of the calculated switching device temperature generated by the present and prior commanded current values to the maximum allowable temperature in the switching device. In contrast to the prior art, the implementations of temperature model defined by equations (3) and (4) represent switching device temperature as an exponential function of time. Given a constant current, the value of the temperature ratio calculated with those implementations will nonlinearly converge to a constant value. If the current signal goes to zero, the values of the temperature ratios will decrease.

In the preferred embodiment, power is computed by periodically summing two power components. A first power component is periodically calculated as a linear function of a current command signal and represents the nearly linear relationship of power to current resulting from a fixed voltage drop across the switching device which is independent of the current. A second power component is periodically calculated as a nonlinear function of the current command signal and represents the resistive heating of the device's internal connections. Therefore, the computation of power may be made to conform with the characteristics of the switching devices being used as follows:

$$P(I) = (K_1 \times I) + (K_2 \times I^2) \quad (5)$$

where
P(I)=power dissipated in the switching device as a function of the current I,
$K_1$=thermal linearity coefficient, $0 \leq 1 \leq K_1$,
$K_2 = (1 - K_1)$ $K_1$ may be chosen to match the characteristics of the particular switching devices being used. Therefore, using equation (5) to compute $P(I_n)$, $P(I_{n-1})$ and $P(I_{nom})$, the model will provide a more accurate representation of temperature rise in the switching device when it is operating with a current overload.

A current limit signal is produced by the numerical control which has a magnitude defaulted to a value representing the peak current value. If the periodic evaluation of the model calculates that the present switching device temperature value equals or exceeds the maximum allowable temperature, the magnitude of the current limit signal is set to a value equal to the nominal current. The motor control 12 limits the current through the switching device as a function of the current limit signal. When subsequent periodic model evaluations result in the present switching device temperature having a magnitude less than the maximum allowable temperature value, the current limit signal is reset to the magnitude representing the peak current value.

More specifically, as long as the value calculated of the temperature ratio is less than unity, the switching device temperature is not equal to or greater than the maximum allowable temperature; and the current limit for the current command signals is maintained at the peak current. If the calculated ratio is equal to or exceeds unity, the model is indicating the maximum or an excessive switching device temperature value; and the current limit is reduced to the nominal current. The current limit is returned to the peak current value after the ratio achieves a predetermined value less than unity. If the numerical control detects that a motor is exceeding any current limit for a predetermined period of time, the switching devices are turned OFF, thereby terminating operation of the motor.

Depending on the hardware available, the temperature models may be primarily executed in either the numerical control 10 or the motor control 12. In the preferred embodiment, a temperature model of the switching device for each motor is evaluated within the path generation processor 66 in the numerical control 10 using data from a temperature model data store 61. In the normal course of its operation, the numerical control will execute a major configuration routine which is used to initialize the control and establish operating constants and parameters. In implementing the present invention, the major configuration routine is used to determine the values of the parameters of peak current $I_{pk}$, nominal current $I_{nom}$, power dissipated at nominal current $P(I_{nom})$, sample interval time of the temperature model T, filter coefficients $K_e$ and G; and the values of those parameters are stored in the temperature model data store 61. Those parameters may be determined by reading data directly from the commissioning data store 64 which data was previously entered based on manufacturer specifications or otherwise determined. Other parameters may be calculated based on the previously recited expressions and data read from the commissioning data store 64. Alternatively, the constants may be chosen by a modification of the above techniques or arbitrarily. The value of $P(I_{nom})$ representing power as a function of the nominal current value is computed using equation (5) as follows:

$$P(I_{nom}) = (K_1 \times I_{nom}) + (K_2 \times I_{nom}^2) \qquad (6)$$

Consequently, except for the values represented by the current command signals, after the major configuration routine, the numerical control has available in the temperature model data store all parametric values necessary to evaluate the temperature model.

The numerical control calculates new position data during position command update intervals, and the new position data is transferred to the motor control at the end of each update interval. Again depending on the implementation of the numerical control and the motor control, all of the temperature models for each of the motors may be updated during each position command update interval. Alternatively, only one model may be updated during one position command update interval, and other models are successively updated during subsequent intervals. The present embodiment uses the latter approach.

Although the position command update interval is constant for each motor configuration, it may differ from configuration to configuration depending on the number of motors being controlled. The temperature models have a relatively large time constant, and the models should be evaluated often enough to provide a good representation of temperature changes. The position command update interval and the sample interval time of the temperature model are established during the execution of the major configuration routine, and the sample interval time of the temperature model will typically be an integer multiple of the position command update interval. In the preferred embodiment, the major configuration routine establishes the sample interval time of the temperature model in a range of from 50 milliseconds to 80 milliseconds.

Figure 3:
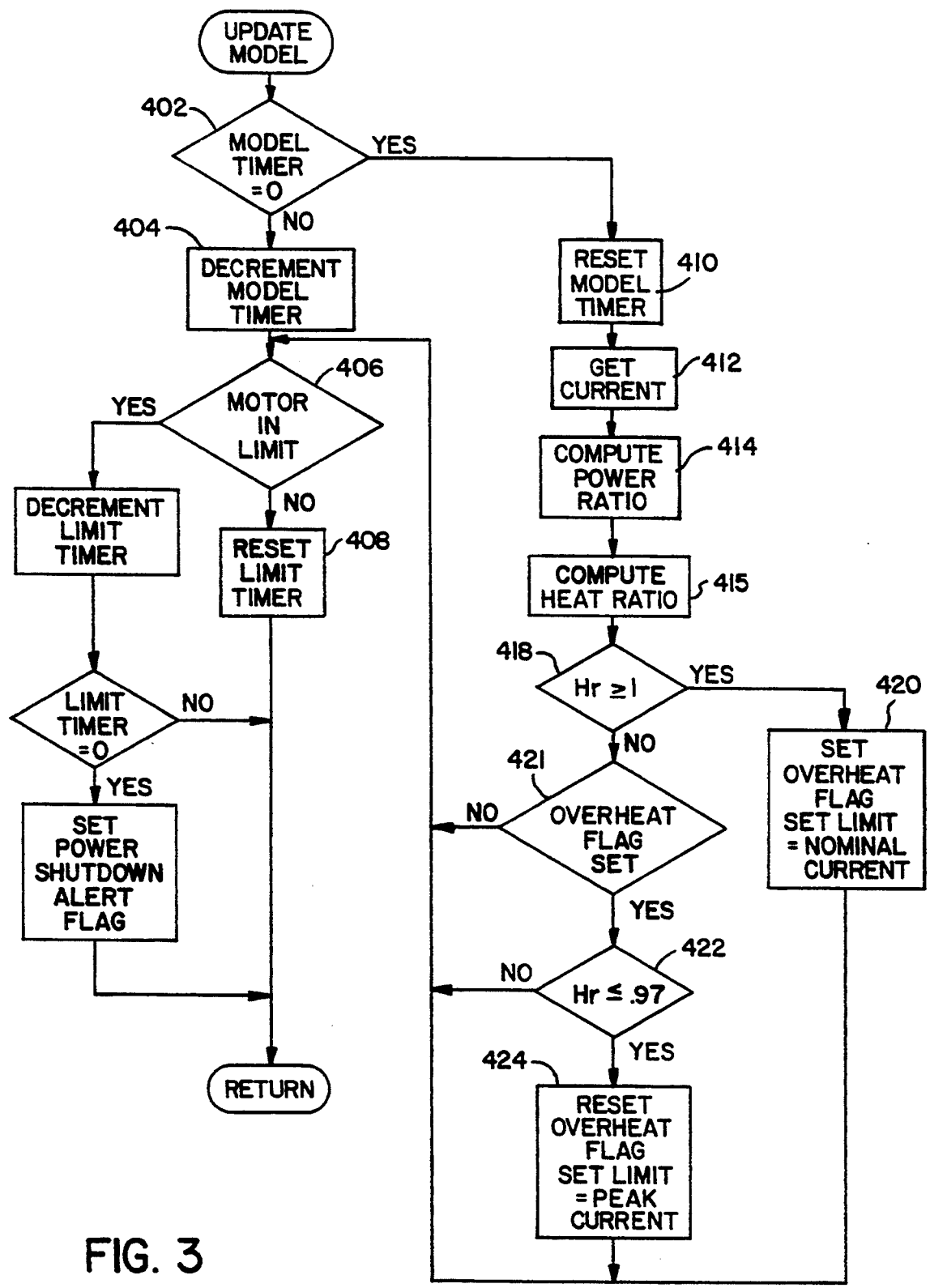
FIG. 3 is a flowchart illustrating the process for providing the temperature model of the present invention.

FIG. 3 is a flowchart of a process for implementing the evaluation of the temperature model of the present invention. The process of FIG. 3 is replicated for each motor, and the process is executed after the generation of new position command data for that motor in the path generation processor 66 of the numerical control 10. At step 402, the process checks the temperature interval timer to determine whether it is time to recalculate the model. If not, at step 404, the temperature interval timer is decremented by the magnitude of the position command update interval.

At step 406, the process determines whether the current command for the switching device for this motor has been clipped by the current limiter. By reading the state of the current limit exceeded flag in the temperature model data store 61, the numerical control can determine if a motor is in a current limit condition. If a current limit condition does not exist, a limit timer is reset at process step 408, and the process ends.

Assume that during the next position command update interval, the process at step 402 determines that the sample interval timer of the temperature model for that motor has timed out. At step 410, the timer is reset; and at step 412, the present current command value is read from the temperature model data store 61. With the preferred equation (3) implementation of the temperature model of equation (1), at step 414, using equation (5), the ratio of present power value as a function of the present current command signal $I_n$ to nominal power is calculated as follows:

$$\frac{P(I_n)}{P(I_{nom})} = \frac{(K_1 \times I_n) + (K_2 \times I_n^2)}{(K_1 \times I_{nom}) + (K_2 \times I_{nom}^2)}$$

The remaining terms of equation (3) are either constants which were stored in the temperature model data store 61 or are values which were calculated and stored during the preceding temperature model update interval, for example, the ratio of $P(I_{n-1})$ to $P(I_{nom})$ and the prior heat ratio $(H_r)_{n-1}$. Therefore, at step 415, the value for the present heat ratio $(H_r)_n$ may be calculated. The ratio compares the present temperature value of the switching device as a function of the thermal time constant and the present and prior current command signals to the maximum allowable temperature in the switching device as established by the nominal current value.

At step 418, the control determines whether the switching device temperature value is at or exceeds the maximum calculated temperature by determining whether the temperature ratio is equal to or greater than unity. If it is, at step 420, an overheat flag is set within the numerical control; and a current limit signal is set to a first magnitude representing a current limit that is equal to the nominal current value. The motor control 12 responds to the first magnitude of the current limit signal by limiting subsequent current command signals to a maximum equal to the nominal current value $I_{nom}$. Therefore, the motor load, acceleration and deceleration requirements or other conditions cannot cause the motor control 12 to produce a current command representing a current overload.

The nominal current limit is maintained over subsequent executions of the process of FIG. 3 until the switching device temperature drops to a value less than the maximum allowable switching device temperature. When a subsequent iteration results in a calculated temperature ratio less than unity, the process at step 421 checks the status of the overheat flag. If the flag is not set, the process moves to step 406. If the overheat flag is set, the process at step 422 determines whether the temperature ratio has a value less than or equal to $0.97 \times I_{nom}$. If it does, at step 424, the numerical control resets the overheat flag and provides a current limit signal magnitude equal to the peak current value. During the next position command update interval, the motor control returns the current limit to the default value of the peak current; and current command signals are limited to a maximum value equal to the peak current value.

Therefore, the current is limited between threshold values defined by the values of the nominal and peak currents. The hysteresis loop prevents the current limit from oscillating between the nominal and peak current values in response to small changes in the value of the temperature ratio around unity. The constant of 0.97 is an arbitrary value, and other values may be chosen which provide the desired system response.

Process at step 406 determines whether the motor associated with the temperature model being evaluated is in a limit condition. Motor velocity commands may result in a required current values in excess of the present current limit, whether nominal or peak. If that is the case, the current limit exceeded flag set by the motor control 12 is used by the numerical control at process step 406. The control will only tolerate a current limit condition for a very short period of time, for example, 200 milliseconds. If a current limit condition is detected, at step 426, the 200 milliseconds limit timer is decremented by the magnitude of the sample interval time of the temperature model. If the current limit condition for that motor continues, during a subsequent time interval, the limit timer will time out as detected at step 428. The process at step 430 causes the numerical control to set a flag for the motor control 12 to shut OFF power to the transistor switches, thereby terminating the operation of the motor. The 200 millisecond interval is established to permit transient peak current requirements that may be required by reversals in motor direction or other hard acceleration changes. However, if the 200 millisecond limit is reached, it is assumed that a motor is stalled, and potential damage to the switching devices is imminent. Time periods other than 200 milliseconds may be chosen to accommodate different switching devices or circumstances.

It should also be noted that although the described current limit strategy switches the current limit between the nominal and peak current values, other current limit strategies may be implemented. For example, the current limit may be switched between other current values. In addition, the current limit may be changed as a function of the change in the magnitude of switching device temperature value or the temperature ratio value.

While the invention has been illustrated in some detail according to the preferred embodiments shown in the accompanying drawings, and while the preferred embodiments have been described in some detail, there is no intention to thus limit the invention to such detail. On the contrary, it is intended to cover all modifications, alterations, and equivalents falling within the spirit and scope of the appended claims.

What is claimed is:

1. A method for limiting current through a switching device as a function of a calculated switching device temperature value, the method comprising the steps of:
    periodically producing current signals;
    periodically evaluating in response to the current signals, a model representing switching device temperature by calculating a temperature value of the switching device as a nonlinear function of switching device current and time;
    producing a limit signal in response to periodically evaluating the model, the limit signal having a value as a function of the temperature value of the switching device calculated by the model; and
    limiting the current through the switching device as a function of the limit signal.

2. The method of claim 1 wherein the switching device temperature value is calculated as a function of a thermal time constant defining an exponential time rate of change of temperature in the switching device as a function of a predetermined current.

3. The method of claim 1 wherein the step of periodically evaluating the model includes the step of periodically calculating the temperature value of the switching device in accordance with $$H_x = K \times P(I) \times [1 - e^{-\frac{t}{K_{th}}}]$$

where
    $H_x$ = temperature of the switching device,
    $P(I)$ = power dissipated in the switching device as a function of current,
    $t$ = time in seconds
    $K_{th}$ = thermal time constant of the switching device
    $K$ = normalizing constant.

4. The method of claim 2 wherein the current command signals include a present current command signal and a prior current command signal and the step of periodically evaluating the model further comprises periodically calculating a present temperature value representing switching device temperature as a function of the thermal time constant, the present current command signal and the prior current command signal.

5. The method of claim 4 wherein the predetermined current represents a nominal current value producing a maximum allowable switching device temperature value, and the step of evaluating the model further comprises the step of periodically comparing the present temperature value of the switching device to the maximum allowable switching device temperature value.

6. The method of claim 5 wherein the step of periodically comparing the present temperature value of the switching device to the maximum allowable switching device temperature value further comprises the step of periodically calculating a ratio of the present temperature value of the switching device to the maximum allowable switching device temperature value.

7. The method of claim 5 wherein the step of producing the current limit signal further comprises the steps of:
    producing a first current limit signal in response to the present temperature value of the switching device being equal to or exceeding the maximum allowable switching device temperature value; and
    producing a second current limit signal in response to the present temperature value of the switching device being less than the maximum allowable switching device temperature value.

8. The method of claim 7 wherein the switching device has a peak current value representing the maximum instantaneous current capability of the switching device and the step of limiting the current further comprises the steps of:
    limiting the current to the peak current value in response to the second current limit signal; and
    limiting the current to the nominal current value in response to the first current limit signal.

9. The method of claim 6 wherein the switching device has a peak current value representing the maximum instantaneous current capability of the switching device and the step of limiting the current further comprises the steps of:
    initially limiting current to the peak current value;
    limiting the current to the nominal current value in response to the ratio being equal to or exceeding a predetermined value; and
    subsequently limiting the current to the peak current value in response to the ratio being a predetermined magnitude less than the predetermined value.

10. The method of claim 9 wherein the predetermined value is unity and the predetermined magnitude is 0.97.

11. The method of claim 6 wherein the step of periodically calculating a new temperature value further comprises the steps of:
   calculating a nominal power value as a function of the nominal current value; and
   periodically calculating a present power value as a function of the present current command signal.

12. The method of claim 11 wherein the step of periodically calculating the nominal power value further comprises the steps of:
   periodically calculating a first power component as a linear function of the nominal current value;
   periodically calculating a second power component as a nonlinear function of the nominal current value; and
   summing the first and the second power components.

13. The method of claim 11 wherein the step of periodically calculating the present power value further comprises the steps of:
   periodically calculating one power component as a linear function of the present current command signal;
   periodically calculating another power component as a nonlinear function of the present current command signal; and
   summing the one and the other power components.

14. The method of claim 11 wherein the power values are calculated as a function of a current in accordance with $$P(I) = (K_1 \times I) + (K_2 \times I^2)$$

where
   $P(I)$ = power dissipated in the switching device as a function of the current I,
   $K_1$ = thermal linearity coefficient, $0 \leq K_1 \leq 1$, and
   $K_2 = (1 - K_1)$.

15. An apparatus for limiting current through a switching device as a function of a calculated switching device temperature value, the apparatus comprising:
   means for periodically producing current signals;
   means responsive to the current signals for periodically evaluating a model representing switching device temperature, the means for periodically evaluating including means for periodically calculating a temperature value of the switching device as a nonlinear function of switching device current and time;
   means responsive to the means for periodically evaluating for producing a limit signal having a value as a function of the temperature value of the switching device; and
   means for limiting the current through the switching device as a function of the limit signal.

16. The apparatus of claim 15 wherein the switching device temperature value is calculated as a function of a thermal time constant defining an exponential time rate of change of temperature in the switching device as a function of a predetermined current.

17. The apparatus of claim 15 wherein the means for periodically evaluating further includes means for calculating temperature in the switching device in accordance with $$H_x = K \times P(I) \times [1 - e^{-\frac{t}{K_{th}}}]$$

where
   $H_x$ = temperature of the switching device,
   $P(I)$ = power dissipated in the switching device as a function of current,
   $t$ = time in seconds,
   $K_{th}$ = thermal time constant of the switching device,
   $K$ = normalizing constant.

18. The apparatus of claim 16 wherein the means for periodically generating current command signals generates a present current command signal and prior current command signals and means for periodically evaluating the model further comprises means for periodically generating a ratio of a present temperature value representing a present temperature of the switching device as a function of the thermal time constant and the present and prior current command signals to a maximum allowable switching device temperature represented by the predetermined current.

19. The apparatus of claim 18 wherein the means for periodically generating the ratio of the present temperature of the switching device to the maximum allowable switching device temperature further comprises means for periodically calculating power as a function of current in accordance with $$P(I) = (K_1 \times I) + (K_2 \times I^2)$$

where
   $P(I)$ = power dissipated in the switching device as a function of the current I,
   $K_1$ = thermal linearity coefficient, $0 \leq K_1 \leq 1$, and
   $K_2 = (1 - K_1)$.

20. The apparatus of claim 19 wherein the switching device has a peak current value representing the maximum instantaneous current capability of the switching device and the means for producing the current limit signal further comprises a current limiter means for limiting the current to the nominal current value in response to the ratio being equal to or exceeding a unity value and subsequently limiting the current to the peak current value in response to the ratio being a predetermined magnitude less than the unity value.

21. A method for limiting current through a switching device as a function of a calculated switching device temperature value, the method comprising the steps of:
   limiting the current through the switching device to a first current value representing a maximum instantaneous current capability of the switching device;
   periodically evaluating a model representing switching device temperature by calculating a present temperature value of the switching device as a nonlinear function of switching device current and time; and
   limiting the current through the switching device to a second current value producing a maximum allowable switching device temperature in response to the calculated present temperature value being at least equal to the maximum allowable temperature of the switching device.

22. The method of claim 21 wherein the method further includes the steps of:
   periodically producing current command signals representing commanded currents; and periodically calculating in response to the current command signals, the present temperature value of the switching device as a nonlinear function of the commanded currents and an exponential function of time.

23. An apparatus for limiting current through a switching device as a function of a calculated switching device temperature value determined from current commanded to be conducted from a power source through the switching device to a motor, the apparatus comprising:
- a motor velocity control for periodically producing current command signals representing commanded currents to be conducted by the switching device as a function of desired motor velocities;
- a controller responsive to the current command signals for producing current limit signals as a function of the controller periodically evaluating a model representing switching device temperature, the controller periodically calculating a temperature value in the switching device as a nonlinear function of the commanded currents and an exponential function of time; and
- a current limiter connected to the controller and the motor velocity control for limiting a current command signal as a function of comparing a current limit signal with the current command signal.

24. The apparatus of claim 23 wherein the controller produces a first current limit signal representing a maximum instantaneous current capability of the switching device in response to periodic evaluations of the model providing a present temperature value for the switching device less than a maximum allowable switching device temperature.

25. The apparatus of claim 24 wherein the controller produces a second current limit signal representing a current producing the maximum allowable switching device temperature value in response to the periodic evaluations of the model providing a present temperature value for the switching device at least equal to the maximum allowable switching device temperature.

26. The apparatus of claim 25 wherein the temperature in the switching device is calculated in accordance with $$H_x = K \times P(I) \times [1 - e^{-\frac{t}{K_{th}}}]$$

where
$H_x$ = temperature of the switching device,
$P(I)$ = power dissipated in the switching device as a function of a current command,
t = time in seconds
$K_{th}$ = thermal time constant of the switching device
K = normalizing constant.

* * * * *